(No Model.)

C. M. RICHMOND.
ARTIFICIAL DENTURE.

No. 277,942. Patented May 22, 1883.

Witnesses:
H. E. Hansmann.
William Paxton.

C. M. Richmond, Inventor.
By Charles E. Foster, Atty.

UNITED STATES PATENT OFFICE.

CASSIUS M. RICHMOND, OF NEW YORK, N. Y., ASSIGNOR TO THE RICHMOND TOOTH CROWN COMPANY, OF SAME PLACE.

ARTIFICIAL DENTURE.

SPECIFICATION forming part of Letters Patent No. 277,942, dated May 22, 1883.

Application filed January 24, 1883. (No model.)

*To all whom it may concern:*

Be it known that I, CASSIUS M. RICHMOND, of the city, county, and State of New York, have invented certain Improvements in Artificial Dentures, of which the following is a specification.

My invention relates to that class of artificial dentures which are secured to and supported by roots or teeth remaining in the mouth of the wearer; and my improvement consists in connecting said dentures to the roots or teeth, as hereinafter described, so that they will be firmly and fixedly supported thereby, and yet be capable of ready removal when necessary.

In an application for Letters Patent heretofore filed I have described an artificial denture consisting of a prepared root and a cap connected thereto, to which the porcelain tooth is secured by a ferrule on the tooth overlapping the cap on the root. In my present invention I secure the tooth to its support without the use of the ferrule on the tooth.

Figure 1:
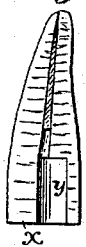
Figure 2:
Figure 3:
Figure 4:
Figure 5:
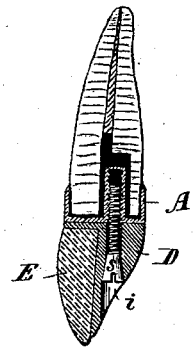

In the drawings, Figure 1 represents in section a root prepared for the attachment of the denture; Fig. 2, a cap for covering the root; Fig. 3, a section through the portion of the denture which is to be clamped directly to the root; Fig. 4, a securing bolt or screw; Fig. 5, a section showing the denture attached, and Fig. 6 a view illustrating the position of a denture comprising several teeth and secured within the mouth.

When the denture is a single tooth and is to be connected to a root, the end of the latter is prepared so as to present a flat face, $x$, and a socket, $y$, and the nerve-cavity is filled suitably to prevent subsequent inflammation, as described in other applications for Letters Patent which I have made, or in any other suitable manner. I then prepare a metal cap, A, with a flange, $a$, to inclose the root and extend between the latter and the gum, so as to prevent the fluids of the mouth from reaching the nerve-cavity or coming in contact with the root, as described in a separate application. A projection, $e$, within the cap A is threaded internally, and is adapted to enter the socket $y$, the attachment being secured to the root by cement, which fills the cavity between the projection and the walls of the socket, as shown in Fig. 5, as also described in another application.

The denture consists of the metallic portion D and the porcelain teeth E, suitably secured thereto and presenting a flat upper face. In the metallic portion, at the point where the latter is opposite the threaded opening in the projection $e$, is an opening, $i$, adapted to receive a screw, $s$, having an enlarged head, which screw, when passed through said opening and into the threaded socket, clamps the denture firmly against the face of the attachment A and holds the denture securely in place, the friction between the conical head of the screw and the socket preventing the screw and denture from turning. While the attachment thus effected prevents any movement of the denture, it permits the ready removal thereof at any time by the simple withdrawal of the screw. When a pin projects downward from the attachment A into a socket in the denture, a transverse screw or key may be used as the securing device.

Figure 6:
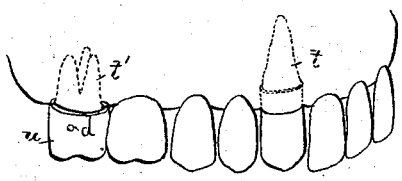

When the denture comprises a series of teeth, it may be secured at one point to a root, $t$, Fig. 6, and may at another point be provided with a cap or cup, $u$, adapted to cover the crown of the tooth $t'$, with which a firm connection may be made by means of a pin, $d$, as described in a separate application heretofore filed.

I claim—

1. The combination, with a natural root, of a metallic attachment covering the end of the root, a denture with a flat upper face adapted to fit the face of said attachment, and a connecting-screw, substantially as set forth.

2. The combination of a denture comprising a metal bridge supporting two or more teeth, prepared roots or natural teeth with attachments secured thereto, and detachable securing devices, whereby the denture is detachably connected to said roots or teeth at different points, as set forth.

In testimony whereof I have signed my name to this specification in the presence of two subscribing witnesses.

CASSIUS M. RICHMOND.

Witnesses:
OTTO BAUMANN,
C. SOLYAM.